Nov. 10, 1936.  E. R. FAUSSET  2,060,561
FRAME WELDER
Filed April 16, 1934  5 Sheets-Sheet 1

INVENTOR
Ernest R. Fausset
BY
Spencer Hardman & Fehr
his ATTORNEYS

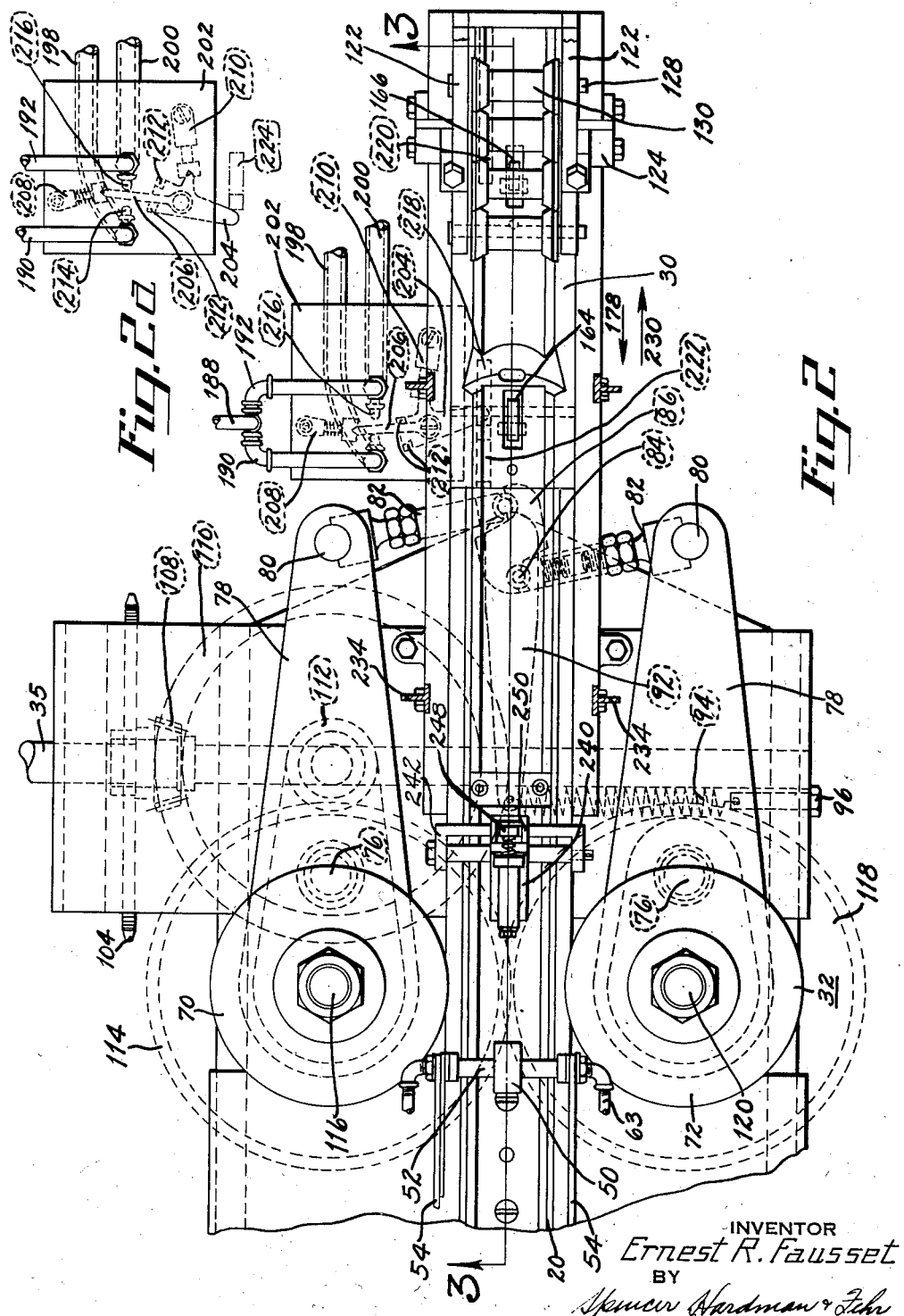

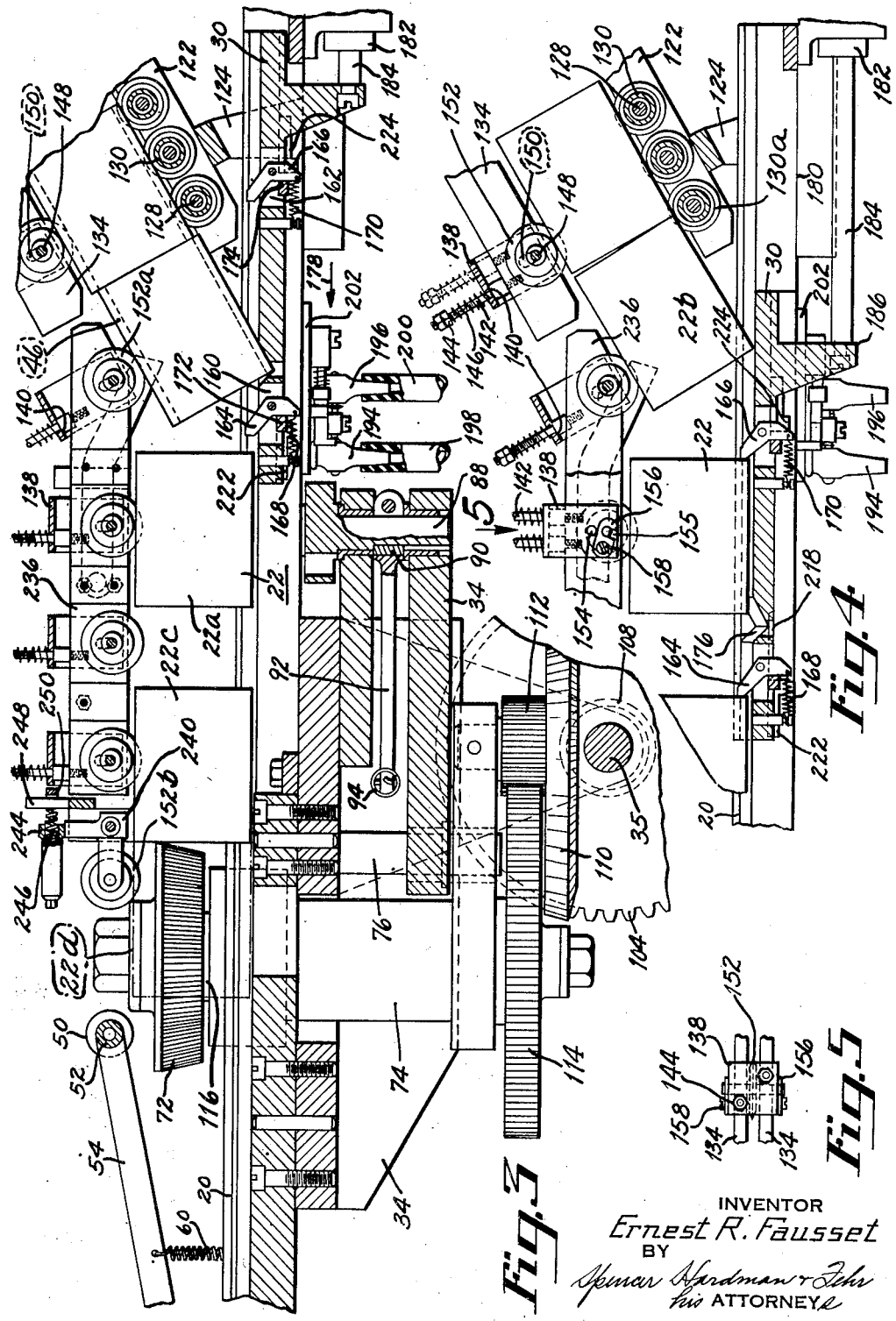

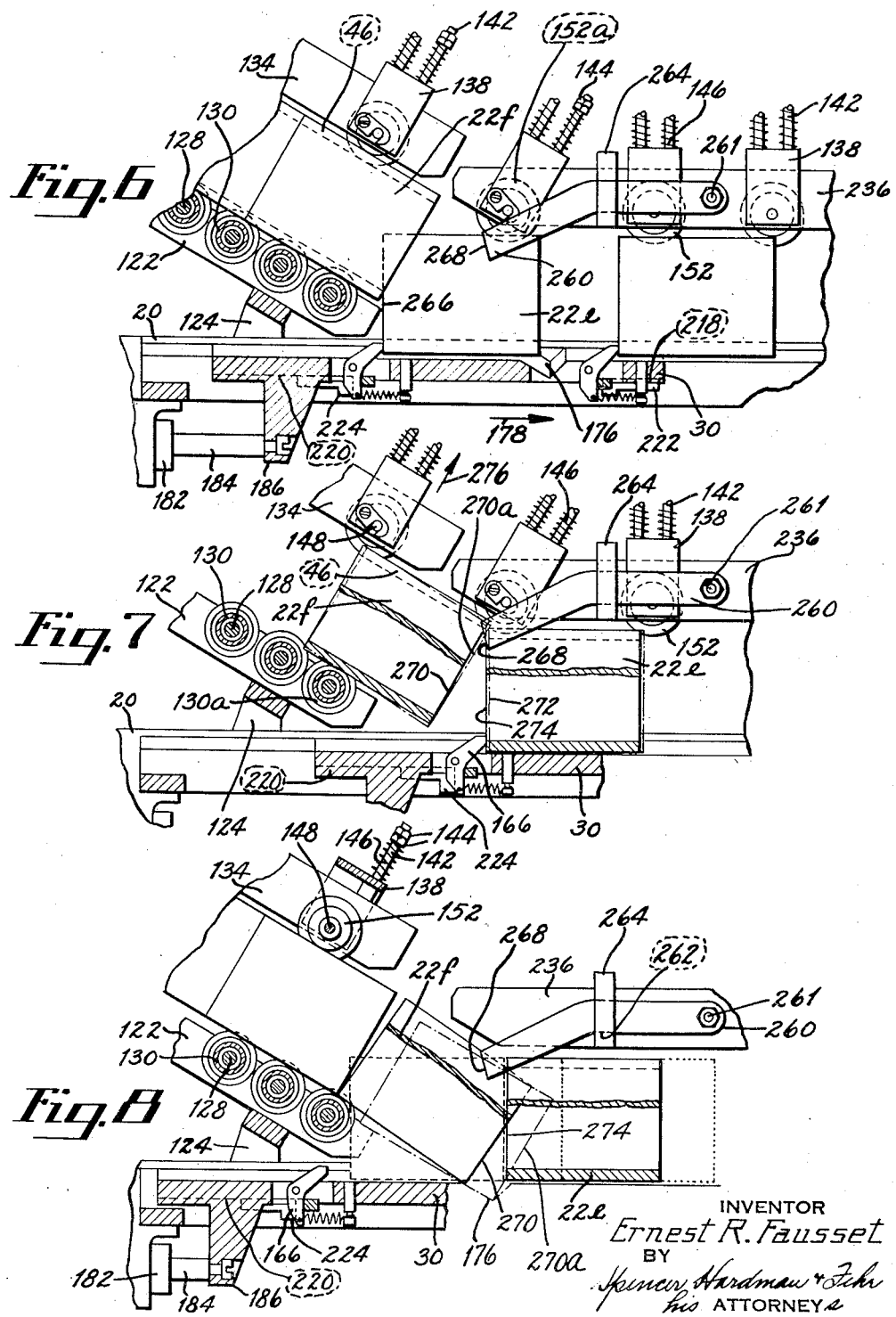

Nov. 10, 1936.   E. R. FAUSSET   2,060,561
FRAME WELDER
Filed April 16, 1934   5 Sheets-Sheet 5
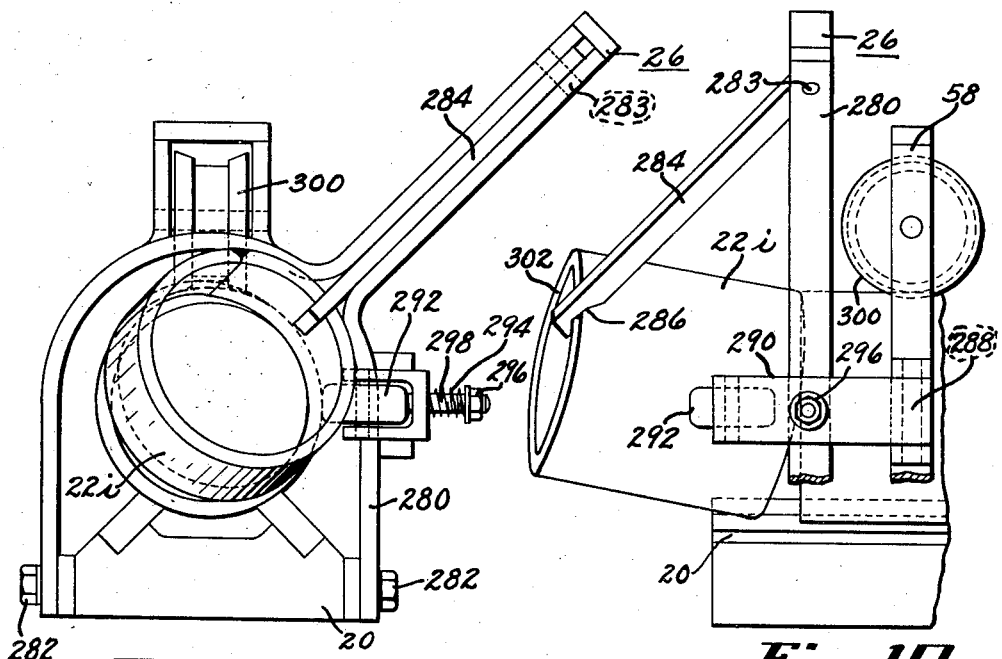
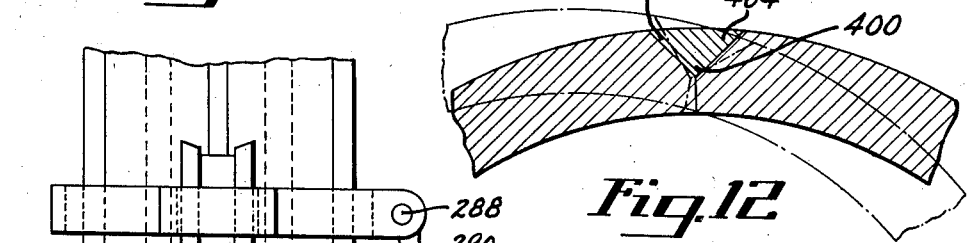
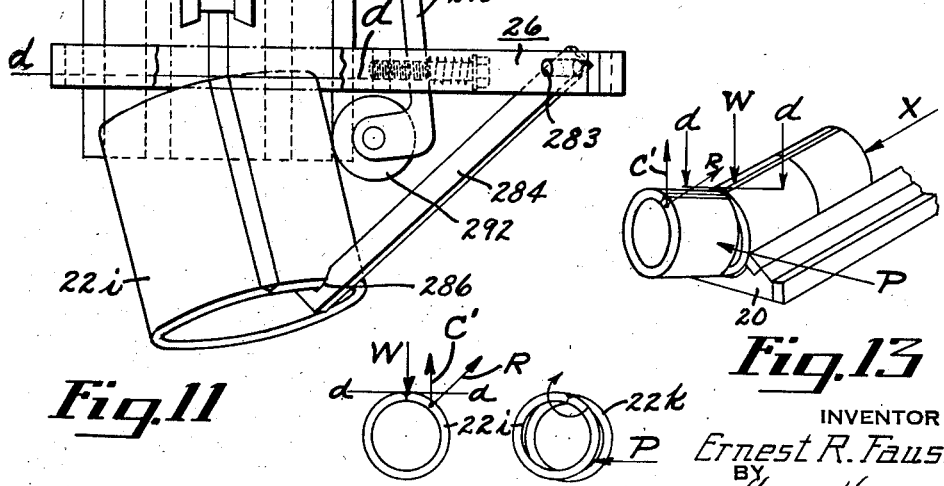
INVENTOR
Ernest R. Fausset
BY
Spencer Hardman Fehr
his ATTORNEYS Patented Nov. 10, 1936

2,060,561

UNITED STATES PATENT OFFICE 2,060,561

FRAME WELDER

Ernest R. Fausset, Anderson, Ind., assignor to General Motors Corporation, Detroit, Mich., a corporation of Delaware Application April 16, 1934, Serial No. 720,710

15 Claims. (Cl. 219—6)

This invention relates to machines for welding tubular articles such as generator field frames, and more particularly to certain improvements on the arc welder of Leo C. Shippy for which application Serial No. 602,948 was filed on April 4, 1932.

In automatically separating weld-joined articles while moving away from a welding agency, it is the present practice to effect a bending of a weld joint between two consecutive articles by rocking one of the same about said weld joint. However, due to the fact that the thickness of the weld varies and the weld itself has not been sufficiently cooled at the assigned place of separation of the articles to acquire that degree of brittleness which favors a break under moderate bending stresses, it sometimes happens that the rocking motion of an article is inadequate to break a weld joint. Furthermore, the broken weld-joints appear jagged due to the considerable deflection of the same before the break occurs and require an additional operation to remove the jagged metal before the articles can be put to further use.

It is among the object of the present invention to devise a method and apparatus for automatically and unfailingly breaking the weld joints between consecutive articles of a row in such manner that all broken weld joints are comparatively even. This object is accomplished by simultaneously bending and twisting the weld joints between consecutive articles.

It is another object of the present invention to provide for an unhindered transfer of articles from an inclined supply chute upon a track leading to a welding agency, and more particularly to prevent an interlocking of articles during such transfer.

Further objects and advantages of the present invention will be apparent from the following description, reference being had to the accompanying drawings wherein a preferred embodiment of the present invention is clearly shown.

In the drawings:

Fig. 2 is an enlarged fragmentary top view of a part of the machine shown in Fig. 1.

Fig. 2a is a fragmentary view of a part of Fig. 2, showing certain elements of the machine, however, in a different position of operation.

Fig. 3 is a fragmentary sectional view taken on the line 3—3 of Fig. 2.

Fig. 4 is another fragmentary sectional view similar to Fig. 3, showing however, certain elements of the machine in a different position of operation.

Fig. 5 is a fragmentary view showing a detail of construction as viewed in the direction of arrow 5 in Fig. 4.

Figure 1:
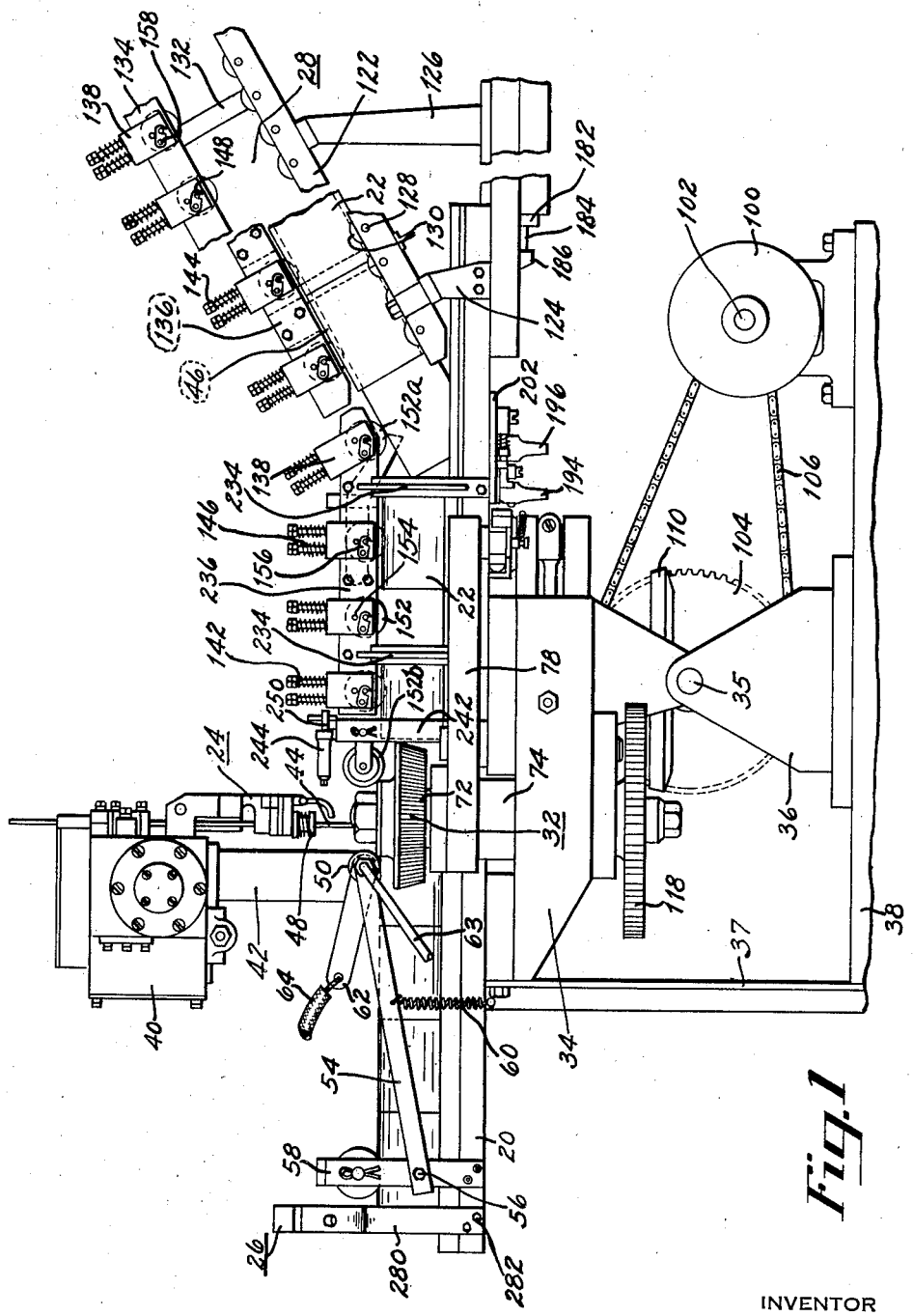
Fig. 1 is a side elevation of a machine embodying the present invention.

Figs. 6 to 8 inclusive are fragmentary sectional views similar to Fig. 4 but inverted 180° and illustrating progressively the interlocking prevention of articles during their transfer from the inclined chute upon the horizontal conveyor.

Figs. 9 to 11 inclusive are a front elevation, side elevation and top view respectively, of the novel weld breaker.

Fig. 12 is a diagrammatic view illustrating the manner in which the continuous weld between adjoining articles is twisted.

Fig. 13 illustrates in a perspective manner the various forces applied to an article for breaking a continuous weld between consecutive articles.

Figs. 14 and 15 are diagrammatic views in which the applied weld breaking forces have been divided into forces causing an article to bend about the connecting weld-joint between two consecutive articles and into forces causing said article to rotate about said weld joint.

Before detailedly describing the improvements of the present machine, it will be necessary briefly to describe the construction and operation of the entire welding machine which in its substantial details is covered in the application of Leo C. Shippy, Serial No. 602,948, filed April 4, 1932.

Referring more particularly to Figs. 1 to 4 inclusive, the machine embodies a horizontal track 20, adapted to guide articles 22 past a welding agency 24 and into cooperation with a weld breaker 26, an inclined chute 28 holding a supply of articles 22 in end-to-end relation, a horizontally reciprocable conveyor 30 transferring the lowermost article from the chute 28 into cooperation with a device 32 which feeds the transferred and conveyed articles past the welding agency 24 and toward the weld breaker 26. The entire structure mentioned so far is supported on a table 34 which is pivotally mounted at 35 upon a base 36 which in turn is mounted on a suitable machine bed 38. A plurality of angles 37, secured in any suitable manner to the machine bed 38 and table 34, serve as tie bars and prevent rotation of table 34 about the pivot axis 35.

Welding agency

Referring particularly to Fig. 1 any well known arc welder head 40, such as the well known Goodspeed type welder head for instance, is supported by a bar 42 which is secured to table 34 in any suitable manner. An electrode 44 of suitable welding composition is fed by the welder head toward or away from the welding seam 46 of an article 22 in such manner that the arc gap between the end of the electrode and the welding seam remains substantially uniform. Any suitable source of electrical power (not shown) is transmitted to the electrode by a sliding contact 48. Adjacent the electrode 44 there is shown a copper roll 50, mounted upon a hollow stub shaft 52 which in turn is journaled in two bars 54, pivoted at 56 to a bracket 58 which is mounted in any suitable manner on track 20. One or more tension springs 60 normally urge the bars 54 clockwise thereby maintaining the copper roll 50 in constant engagement with the weld of an article which is being fed past the welding agency. Secured in any suitable manner to the copper roll 50 is a conductive lever 62 to which is attached a cable 64 leading directly to the ground, thereby establishing a satisfactory ground connection for the copper roll 50 and also for the welding current. Water from any suitable source is conducted to the hollow stub shaft 52 through a pipe 63, and another pipe (not shown) on the opposite end of said hollow stub shaft leads the water flowing through the latter to any suitable destination, thus providing for a continuous flow of water through the hollow stub shaft 52 in order to cool the copper roll 50. No further description of the arc welder head and its control is deemed necessary because they are well known to those skilled in the art and because this welder head does not form part of the present invention.

Device for feeding an article past the welding agency

Referring particularly to Figs. 1, 2 and 3, two rotary wheels 70 and 72 are shown engaging the periphery of an article 22 for moving the latter over the track 20 and past the electrode 44 which is in alignment with the welding seam of said article. Both of these wheels 70 and 72 are rotatably supported in brackets 74 which are mounted in any suitable manner on table 34 for rotation about the shafts 76. Each one of the brackets 74 has a long arm 78 from which extends a pin 80 against which bears with one end a lengthwise adjustable link 82 the other end of which is pivotally connected at 84 with a double arm lever 86 eccentrically of the stub 88 thereof which is journaled in table 34 as best shown in Fig. 3. Keyed at 90 to said stub 88 is a bar 92 the free end of which has attached thereto a tension spring 94 which is also attached to a head pin 96, held by the machine table 34 as best shown in Fig. 2. The tension of the spring 94 tends to rock the brackets 74 in a direction to force the wheels 70 and 72 into engagement with the periphery of an article 22 on track 20 as can be readily understood from Fig. 2.

The wheels 70 and 72 are rotated at a uniform speed by means of an electric motor 100 (see Fig. 1), the shaft 102 of which carries a sprocket wheel (not shown), driving a larger sprocket wheel 104, rotatably mounted on the shaft 35, by means of a chain 106. Rotatable in unison with said sprocket wheel 104, is a bevel pinion 108 (see Fig. 2), meshing with a larger bevel gear 110 which, as shown in Figs. 2 and 3, is rotatably mounted in one of the brackets 74. Integral with or rotatable in unison with bevel gear 110 is a small gear 112, meshing with a larger gear 114, mounted on a spindle 116 which carries the wheel 70 and is journaled in a bracket 74 in any suitable manner. As best shown in Fig. 2, a gear 118, which is identical with gear 114, meshes with the latter, and this gear 118 is mounted on a spindle 120 which carries the wheel 72 and is journaled in the other bracket 74. The teeth of the two meshing gears 114 and 118 are of such size that slight variation in the diameter of the articles 22 passing between the wheels 70, 72, does not result in a demeshing of the referred gears.

Chute for stored articles

Referring to Figs. 1, 2 and 3, two parallel bars 122 are held in spaced parallel relationship and suitably inclined toward the track 20 by pedestals 124 and 126, mounted on track 20 in any suitable manner. Rotatably supported on equally spaced stubs 128, connecting the bars 122, are rolls 130 which are adapted to support and guide a plurality of stored articles 22 upon the conveyor 30. Suitably supported on one of the bars 122 by means of uprights 132 are two parallel spaced bars 134 (see also Fig. 5), which are held properly spaced by a plurality of blocks 136 interposed between said bars 134 at frequent intervals. Straddling the two bars 134 at equal distances are a plurality of yokes 138, each of which rests against the shoulders 140 of two bolts 142 which are threaded into the bars 134 in the manner shown in Fig. 5. Interposed between each yoke 138 and nuts 144 of each bolt is a compression spring 146, tending to maintain said yoke in engagement with the shoulders 140 of the bolts 142. Journaled in each yoke 138 is a stud 148 which extends through aligned oblong slots 150 of the bars 134 and rotatably supports intermediate these bars a roll 152, having a double beveled periphery adapted to ride in the welding seams 46 of the articles in the chute and keep them in alignment. It is obvious that each yoke 138, carrying a guide roll 152, may yield and further compress its springs 146, and it also appears from Fig. 1 that the yokes are spaced apart such a distance that at least one guide roll 152 registers with the welding seam of one article in the chute under all circumstances.

Each one of the yokes 138 is further provided with two aligned holes 154 directly above the holes which presently journal the studs 148. These additional holes are provided for the purpose of adjusting the guide rolls to articles of greater diameter. In that case the studs 148 are simply retracted from their present journals in the yokes 138 and from the guide rolls 152 and inserted into the holes 154 and through the guide rolls. One end of each of the studs 148, which extends beyond its yoke, is provided with an annular groove 155 (see Fig. 5) into which projects a latch member 156, pivoted at 158 to each yoke 138. These latch members prevent longitudinal movement of the studs 148 once they are inserted in their proper holes in the yokes 138. The overhanging bars 134, which carry the yokes 138 are naturally so spaced from the bottom rolls 130 that articles of either diameter may freely pass between the same.

Horizontal conveyor

Movable longitudinally on the track 20 in suitable guides thereof is the conveyor 30 which is provided with two recesses 160 and 162, pivotally receiving dogs 164 and 166 respectively, therein. Both of these dogs 164 and 166 are normally urged by springs 168 and 170 into engagement with stops 172 and 174 respectively, of the conveyor 30. The dogs 164 and 166 are the only elements of the conveyor which may engage an article 22 when lying flat on the track 20 as shown in position 22a. When the dogs 164, 166 are in the normal position and upon movement of the conveyor 30 toward the left from the position shown in Fig. 3, the article 22a and an article 22, lying flat on the track and intermediate the two dogs, will be moved over the track toward the feeding wheels 70, 72 by means of said dogs as can be readily understood. During movement of the conveyor 30 toward the right into the position shown in Fig. 3, the dogs 164, 166 will be yielded underneath any articles which rest flat on the track 20 and are in the path of movement of said dogs. Referring more particularly to Fig. 4, the lowermost article 22b in the chute rests with its foremost peripheral edge on the carriage 30 and is prevented thereby from leaving the chute. The carriage 30 is provided with a deep notch 176 which during movement of the carriage toward the right as viewed in Figs. 3 or 4 aligns with the foremost peripheral edge of the article 22b, permitting the latter to descend from the foremost chute roll 130a and drop flat on the track 20. During the succeeding forward stroke of the reciprocable conveyor 30 in the direction of arrow 178, the just discharged article will be carried over the track 20 by the dog 166 and the previously discharged article 22a will also be carried further toward the welding agency by the dog 164. It may be stated in advance that the conveyor 30 is fluid pressure reciprocated so that the same advances rather rapidly until the article 22a engages the article indicated 22c and pushes the latter into engagement with the article 22d which is presently fed past the welding agency by the wheels 70, 72. The rotary speed of these feeding wheels 70, 72 is such that an article is fed by these wheels at a slower rate than the conveyor 30 normally reciprocates. It therefore, follows that when the conveyor 30 has traveled through a partial forward stroke, i. e. when the articles 22a and 22c have been pushed into engagement with the presently fed article 22d, the feeding speed of the latter controls the further forward motion of the conveyor 30 which results of necessity in an end-to-end engagement between the articles 22c and 22d when the article 22c is gripped by the feeding wheels 70, 72. Substantially at that time the forward stroke of the conveyor is completed and the same starts to retract quickly into the position shown in Fig. 3, the article 22a then having been advanced into the position in which article 22c is shown in Fig. 3. Toward the end of such retracting movement of the conveyor 30 into the position shown in Fig. 3, the now lowermost article in the chute is free to descend upon the track, and during the following forward stroke of the conveyor, the various articles are again advanced toward the welding agency and past the same in the previously described order. It is, therefore, evident that all of the articles are joined together by a continuous weld which is to be broken apart between adjoining articles by a device to be described later.

Mounted on the lower surface 180 of the track 20 is a cylinder 182, containing a double acting piston (not shown), the piston rod 184 of which is connected in any suitable manner with a depending lug 186 of the conveyor 30. Each side of the cylinder 182 is connectible with any suitable supply of fluid pressure (not shown) such as compressed air, by means of a pipe 188, communicating with the fluid pressure supply, two branches 190 and 192 of the pipe 188 which are connected with conventional blow-guns 194 and 196 respectively, and pipes 198, 200 which connect the blow-guns 194 and 196 with the right- and left-hand side, respectively, of the cylinder 182 as viewed in Fig. 3 or 4. These blow-guns are attached in any suitable manner to a base 202 which in turn is mounted on the lower surface 180 of track 20. Mounted on that same base 202 for coaxial rotation are a three armed lever 204 and a blow-gun shifter 206 as best shown in Fig. 2. Straddled over the tip of said shifter 206 and one of the arms of lever 204 are spring urged yokes 208 and 210 respectively, which are pivotally mounted on the base 202. Another arm of the lever 204 is provided with two spaced projecting lugs 212 between which the shifter 206 may be rotated. The valve stems 214 and 216 of the conventional blow guns 194 and 196, respectively, are facing each other and are in the path of rotation of the shifter 206, as appears clearly from Fig. 2. Adjustably mounted in any suitable manner in longitudinal grooves 218 and 220 of the conveyor 30 are lugs 222 and 224 (see also Fig. 3), which are in alignment with still another arm of lever 204 and adapted to shift said lever from one extreme position to another extreme position and vice versa in order to cause and regulate the operation of either blow-gun.

It appears from Fig. 2, in which the conveyor 30 is shown in most retracted position, that the lug 222 has just shifted the lever 204 counter-clockwise into the position shown, whereby the shifter 206 is urged against the valve stem 214 and opens the blow-gun 194 not only by means of the spring urged yoke 208 but also by means of the right-hand lug 212 of the lever 204 which is urged in counter-clockwise direction by the spring urged yoke 210 as can readily be understood. Therefore, during the latter part of movement of the conveyor 30 in the direction of arrow 230 into the position shown in Fig. 2, the lug 222 on said conveyor causes opening of the blow gun 194 and admission of fluid pressure to the right-hand side of the cylinder 182 as viewed in Fig. 3 or 4, whereupon the piston therein and therewith the conveyor 30 is caused to advance in the direction of arrow 178 (see Fig. 2). Toward the end of such advancing movement of the conveyor 30, the lug 224 thereof engages and shifts lever 204 into the position shown in Fig. 2a. As soon as the spring urged yoke 210 and the engaged arm of lever 204 are moved beyond dead center, said spring urged yoke quickly shifts the lever 204 into the position shown in Fig. 2a and during such quick shifting of lever 204, the left-hand lug 212 thereof engages and rotates the shifter 206 clockwise as viewed in Fig. 2. Clockwise rotation of shifter 206 results in disengagement of the same from the valve stem 214 and engagement and depression of the valve stem 216 whereupon fluid pressure is admitted to the left-hand side of cylinder 182, resulting in movement of the completely advanced conveyor 30 into the most retracted position shown in Figs. 2 and 3. The spring urged yoke 208 naturally assists the shifter 206 in the depression of either valve stem.

*Alignment of welding seam of articles during horizontal conveyance toward and past the welding agency*

Secured in any suitable manner to the track 20 are a number of frames 234, carrying parallel spaced bars 236 which are in alignment with the over-hanging bars 134 of the inclined chute. These bars 236 carry a plurality of the earlier explained yokes 138 and guide rolls 152. The guide roll 152a most remote from the welding agency not only registers with the welding seam of the lowermost article in the chute but remains in registration with the same during its transfer upon the track 20, as appears more clearly from Figs. 6 to 8 inclusive. The last guide roll 152b adjacent the welding agency is journaled in a bracket 240 which in turn is rotatably supported by a frame 242 (see Fig. 1), mounted in any suitable manner on track 20. This bracket 240 has mounted thereon a shell 244 receiving a compression spring 246, bearing with its exposed end against a stop plate 248 which is secured to the bars 236 in any suitable manner. This spring 246 yieldingly urges the guide roll 152b into registry with a welding seam of an article which is being fed past the welding agency as can be readily understood from Fig. 3. Attached to the shell 244 is a yoke 250 which straddles the stop plate 248 and prevents the guide roll carrying bracket 240 from excessive counterclockwise rotation under the tendency of spring 246 when the machine is not in operation.

*Prevention of interlocking of articles during transfer from chute upon track*

Referring more particularly to Figs. 6 to 8 inclusive, which illustrate progressive steps in the transfer of the lowermost article from the chute upon the track, a lever 260 is pivotally mounted at 261 on one of the bars 236 and guided for rotation in a preassigned plane parallel to the welding seams of the articles by a groove 262 in a block 264 which in any suitable manner is attached to a bar 236. Fig. 6 illustrates the relative position of articles on the track and in the chute immediately after the article 22e has been transferred from the chute upon the track 20. It appears from Fig. 6 that the peripheral edge 266 of article 22e retains the articles in the chute within the same. Upon an advancing movement of conveyor 30 in the direction of arrow 178, article 22e is also advanced and the descent of the articles in the chute is controlled for a certain length of time by the advancing article 22e as can be readily understood. The danger of an interlocking of the lowermost article 22f in the chute with the advancing article 22e arises when the latter has been considerably advanced and the following article 22f is about to descend upon or lap over the periphery of article 22e due to the inclined descent of article 22f with respect to the horizontally advancing article 22e. If such lapping of articles actually takes place, the result is sometimes an interlocking of the articles, causing not only an interruption in the operation of the machine but eventual serious damage to the latter. The function of the lever 260 is to prevent such overlapping of the article 22f and more particularly to cause the same to dodge the periphery of article 22e during the danger period. Fig. 7 illustrates the relative positions of the articles 22e and 22f in which, without the lever 260, article 22f might easily overlap article 22e. Without the provision of the lever 260, article 22f in the full line position of Fig. 7 would probably slide over the periphery of article 22e in full line position, however, the shoulder 268 of lever 260 prevents such sliding since the peripheral edge 270 of article 22f in full lines engages the shoulder 268 of lever 260 thus serving as a stop for further unrestricted descent of article 22f by gravity from the chute. During further advancing movement of article 22e into the dot-and-dash position, article 22f rocks by gravity about the lowermost supporting roll 130a into the dot-and-dash position in which the end surface 270a of the rocked article bears against the peripheral edge 272 of article 22e in the dot-and-dash position. It appears clearly from Fig. 7 that the article 22f can rock about the lowermost supporting roll 130a from the full line position into and beyond the dot-and-dash position since the only guide roll 152 which registers with the welding seam of said article is yieldable in the direction of arrow 276 and since the greater mass of said article is at one side of the sole supporting roll 130a. The fact that the greater mass of the article 22f is located at one side of the sole supporting roll 130a, and the guiding influence of the shoulder 268 of lever 260 are responsible for rocking article 22f in the explained manner. After further advancement of article 22e beyond the dot-and-dash position, the end surface 270a of article 22f will have descended below the periphery or article 22e and the peripheral edge 270 of the article 22f will ride for a short time along the end surface 274 of article 22e. Finally after still further advancement of the article 22e, the peripheral edge 270 of article 22f will also clear the end surface 274 of article 22e, whereupon article 22f is free to descend into the full line position shown in Fig. 8 in which position said article partly enters article 22e in the full line position. However, such entering of the article 22f into the article 22e as shown in Fig. 8 does not cause an interlocking between the two articles as can be readily understood. The dot-and-dash position of article 22f in Fig. 8 illustrates the unobstructed descent of said article into the deep notch 176 of the conveyor, and the dash-position illustrates the same article lying flat on the track 20. At the time article 22f is in the dash position as shown in Fig. 8 ready for a partial advancement toward the welding agency, article 22e is in the dotted position. From the foregoing description it appears clearly that the lever 260 in fact causes the lowermost descending article 22f in the chute to dodge a possible interlocking with the advancing article 22e on the track 20.

*Improved weld breaker*

Referring to Fig. 1 and particularly to Figs. 9 to 15 inclusive, a bracket 280 is attached by screws 282 to the track 20 and pivotally supports at 283 a bar 284 having a notch 286. As best shown in Fig. 9, the bar 284 rotates in a plane which is inclined approximately 45 degrees to the plane of the track. Pivotally mounted at 288 on the earlier referred bracket 58 is a lever 290, rotatably supporting a roller 292 which is normally urged toward the weld-joined articles on track 20 by a compression spring 294, interposed between the lever 290 and a nut 296 which is threadedly received by a bolt 298 projecting from bracket 280. Bracket 58 also rotatably supports a roll 300 which forces an article passing underneath said roll upon the track 20. It follows from the foregoing description that the articles, having passed the welding agency are all joined together by a continuous weld which is to be broken between consecutive articles by cooperation between the notched bar 284, the yielding roll 292 and the overhanging roll 300. The entire row of weld-joined articles is uniformly fed toward the left-hand end of the track 20 in Fig. 1 where the breaker mechanism is located. The foremost article 22i of said row, when about to leave the track 20, is engaged with its foremost end surface 302 by the notch 286 of bar 284 which at that time is in a vertical position if viewed in Fig. 10. Upon continued forward motion of the weld-joined articles, the foremost thereof is caused to rock substantially about the axis d—d by the vertical component C' of the resulting turning movement R of bar 284 from vertical position into that shown in Fig. 10. The next following article 22k is during that time held against track 20 by the overhanging roll 300. Simultaneously with the rocking of the foremost article 22i about the axis d—d, the pressure roll 292 exerts a force P against said article causing the same slightly to rotate about the continuous weld which results in a twisting of the weld-joint between the articles 22i and 22k as illustrated in Fig. 12. The bending of the weld-joint causes a tearing substantially at the place 400 thereof, whereas the twisting of said weld joint causes a tearing substantially at the places 402 and 404 thereof, so that the weld-joint is torn into simultaneously from three equi-angularly spaced points thereof as can be readily understood. The break in the weld-joint thus accomplished is comparatively smooth and is flush with the ends of the articles 22i and 22k. By the time the break in the weld-joint takes place, the foremost article 22i has reached the end of track 20 and descends into any suitable receptacle or upon a suitable conveyor (neither shown). This same procedure takes place every time a new article engages the bar 284. Figs. 14 and 15 illustrate in a diagrammatic manner the individual forces acting on the articles 22i and 22k and causing the simultaneous bending and twisting of the connecting weld-joint. In Fig. 13 the force X represents the force with which the feeding wheels 70 and 72 advance the row of welded articles on track 20, and the force W represents the counterforce of roll 300 against the tendency of article 22k to rise from the track while article 22i is thus raised by bar 284.

While the form of embodiment of the present invention as herein disclosed, constitutes a preferred form, it is to be understood that other forms might be adopted, all coming within the scope of the claims which follow.

I claim:

1. In combination with means for supporting and guiding a moving row of articles connected by a continuous weld, means for rocking the foremost article about its weld-joint with the following article; and means including the rocking means for rotating said foremost article about the continuous weld as an axis thereby twisting said weld-joint.

2. In combination with means for supporting and guiding a moving row of articles connected by a continuous weld, means for simultaneously rocking the foremost article about its weld-joint with the following article; and means responsive to rocking of said foremost article and including the rocking means for rotating said article about the continuous weld thereby twisting said weld-joint.

3. In combination with means for supporting and guiding a moving row of articles connected by a continuous weld, means responsive to movement of the row of articles for simultaneously rocking the foremost article about its weld-joint with the following article and rotating said foremost article about the continuous weld thereby twisting said weld-joint.

4. In a welding machine the combination of a track supporting and guiding a row of articles joined by a continuous weld; a pivotally mounted lever having a notch adapted to receive a portion of the foremost article of the moving row and rock said article about its weld-joint with the following article upon movement of the row of articles; means retaining said following article on the track; and means for rotating said foremost article about the continuous weld thereby twisting said weld-joint.

5. In a welding machine, the combination of a track supporting and guiding a row of articles joined by a continuous weld; means for rocking only the foremost article of the row about its weld-joint with the following article upon movement of the row of articles; and a spring urged roll engaging said foremost article and rotating the same about the continuous weld thereby twisting said weld-joint.

6. In a welding machine, the combination of a track supporting and guiding a row of articles joined by a continuous weld; a pivotally mounted lever having a notch adapted to receive a portion of the foremost article of the row and rock said article about its weld-joint with the following article upon movement of the row of articles; means retaining said following article on the track; and a spring urged roll engaging said foremost article and rotating the same about the continuous weld thereby twisting said weld-joint.

7. In a welding machine, the combination of a track supporting and guiding a row of articles joined by a continuous weld; a pivotally mounted lever having a notch adapted to receive a portion of the foremost article of the row and rock said article about its weld-joint with the following article upon movement of the row of articles; a rotatable roll retaining said following article on the track; and a spring urged roll engaging said foremost article and rotating the same about the continuous weld thereby twisting said weld-joint.

8. In a machine of the character described, the combination of an inclined chute holding a plurality of hollow cylindrical articles in end-to-end order; a welding agency; a horizontal track supporting and guiding articles from adjacent the chute toward and past the welding agency; a conveyor for transferring only the lowermost article from the chute upon the track and for advancing said article on said track; and means controlling the transfer of the lowermost article in the chute upon the track in response to advancement of the last transferred article thereon to prevent interlocking of both articles.

9. In a machine of the character described, the combination of an inclined chute holding a plurality of hollow cylindrical articles in end-to-end order; a welding agency; a horizontal track supporting and guiding articles from adjacent the chute toward and past the welding agency; a conveyor for transferring only the lowermost article from the chute upon the track and for advancing said article on said track; and a pivotally mounted lever so located with respect to the chute as to permit the lowermost article within the chute to descend by gravity toward the track and to follow the last transferred article while being advanced on the track until said lowermost article is about to descend with its forward internal peripheral edge upon the periphery of said advancing article when said descending frame engages said lever and is thereby prevented from further following the advancing article, said lever thereafter guiding the descending frame past the adjacent end of the advancing frame while the forward end only of said descending article drops by gravity upon the conveyor whereas the opposite end of said article is held within the chute until the conveyor causes transfer of said article upon the track by permitting the article to leave the chute entirely.

10. In a machine of the character described, the combination of a track supporting and guiding articles toward a welding agency; yokes overhanging said track, said yokes providing a plurality of aligned journals differently distanced from the track; and rolls adapted to register with the welding seams of the articles on the track for maintaining said seams in alignment with the welding agency, said rolls being journaled in any one of the aligned journals of the yokes depending upon the size of the articles.

11. In a machine of the character described, the combination of a track supporting and guiding articles toward a welding agency; spring urged yokes overhanging said track, said yokes providing a plurality of aligned journals differently distanced from the track; and rolls adapted to register with the welding seams of the articles on the track for maintaining said seams in alignment with the welding agency, said rolls being journaled in any one of the aligned journals of the yokes depending upon the size of the articles.

12. In a machine of the character described, the combination of a welding agency, an inclined track supporting and linearly guiding a supply of articles having welding seams to be welded; a horizontal track in alignment with the inclined track for supporting articles and guiding the same toward and past the welding agency; means for transferring the lowermost articles from the inclined track upon the horizontal track; means for advancing an article on the horizontal track toward the welding agency; spring urged yokes overhanging both tracks, said yokes providing a plurality of aligned journals differently distanced from their respective tracks; and rolls adapted to register with the welding seams of the article on both tracks for maintaining said seams in alignment with the welding agency during movement of the articles on either track and during transfer from the inclined track upon the horizontal track, said rolls being journaled in any one of the aligned journals of the yokes depending upon the size of the articles.

13. In a machine of the character described, the combination of a track supporting and guiding articles toward a welding agency; parallel spaced bars overhanging said track and extending parallel thereto, said bars having aligned oblong slots extending laterally of said bars at preassigned distances from each other; bolts extending from said bars away from the track and located adjacent the slots of the bars, each bolt having a shoulder; yokes resting by gravity on the shoulders of the bolts, the latter extending through the yokes and said yokes providing a plurality of journals differently spaced from the track; a plurality of springs interposed between the yokes and nuts on the bolts for yieldingly retaining the yokes in engagement with the shoulders of the bolts; and rolls located intermediate the spaced bars and adapted to register with the welding seams of the articles on the track for maintaining said seams in alignment with the welding agency, said rolls being journaled in any one of the aligned journals of the yokes depending upon the size of the articles, and the slots in the bars permitting the journalling of each of the rolls in either journal of a yoke.

14. In combination with a guide for a moving row of articles connected by a continuous weld, a pivotally mounted member having a notch adapted to receive a leading portion of the foremost article of the approaching row, said member being rotatable in a plane which is substantially parallel to the row and inclined at an angle of less than 90° relative to a plane which passes through the weld joints between consecutive articles and through the center of gravity of the articles.

15. In combination with a guide for a moving row of articles connected by a continuous weld, a notched member so pivotally mounted as to be rotatable in a plane substantially passing through the center of gravity of all articles of the row, said member normally assuming a position in which the notch receives a leading depending portion of the foremost article of the approaching row.

ERNEST R. FAUSSET.